US008683390B2

(12) United States Patent
de los Reyes (10) Patent No.: US 8,683,390 B2
(45) Date of Patent: Mar. 25, 2014

(54) MANIPULATION OF OBJECTS ON MULTI-TOUCH USER INTERFACE

(75) Inventor: August de los Reyes, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1143 days.

(21) Appl. No.: 12/243,800

(22) Filed: Oct. 1, 2008

(65) Prior Publication Data

US 2010/0083111 A1   Apr. 1, 2010

(51) Int. Cl.
*G06F 3/033* (2013.01)
*G06F 3/048* (2013.01)

(52) U.S. Cl.
USPC ............ 715/863; 715/788; 715/792; 715/793

(58) Field of Classification Search
USPC .................. 715/702, 863, 788, 790, 792–793
See application file for complete search history.

(56) References Cited

U.S. PATENT DOCUMENTS

| | | | | |
|---|---|---|---|---|
| 5,825,352 | A * | 10/1998 | Bisset et al. | 345/173 |
| 6,664,991 | B1 * | 12/2003 | Chew et al. | 715/863 |
| 7,339,580 | B2 | 3/2008 | Westerman et al. | |
| 2005/0052427 | A1 * | 3/2005 | Wu et al. | 345/173 |
| 2006/0192775 | A1 * | 8/2006 | Nicholson et al. | 345/211 |
| 2007/0152984 | A1 * | 7/2007 | Ording et al. | 345/173 |
| 2007/0177803 | A1 * | 8/2007 | Elias et al. | 382/188 |
| 2008/0015841 | A1 * | 1/2008 | Longe et al. | 704/1 |
| 2008/0029691 | A1 | 2/2008 | Han | |
| 2008/0030463 | A1 * | 2/2008 | Forest | 345/156 |
| 2008/0036743 | A1 * | 2/2008 | Westerman et al. | 345/173 |
| 2008/0092245 | A1 | 4/2008 | Alward et al. | |
| 2008/0174570 | A1 * | 7/2008 | Jobs et al. | 345/173 |
| 2009/0259964 | A1 * | 10/2009 | Davidson et al. | 715/788 |
| 2009/0307623 | A1 * | 12/2009 | Agarawala et al. | 715/765 |

OTHER PUBLICATIONS

Wu; Mike, et al., "Gesture Registration, Relaxation, and Reuse for Multi-Point Direct-Touch Surfaces," Proceedings of the First IEEE International Workshop on Horizontal Interactive Human-Computer Systems (TABLETOP '06) 0-7695-2494-X/05, IEEE Computer Society, copyright 2006. 8 pgs.*

Malik; Shahzad, et al., "Interacting with Large Displays from a Distance with Vision-Tracked Multi-Finger Gestural Input," UIST'05, Oct. 23-27, 2005, Seattle, Washington, USA. Copyright 2005 ACM 1-59593-023-X/5/0010, pp. 43-52.*

(Continued)

*Primary Examiner* — Steven Sax
*Assistant Examiner* — Wilson Varga
(74) *Attorney, Agent, or Firm* — Jeremy Snodgrass; Glen Johnson; Micky Minhas (57) ABSTRACT

Embodiments related to the manipulation of objects on a multi-touch graphical user interface are disclosed. For example, in one disclosed embodiment, a method of operating a multi-touch graphical user interface on a computing device comprises displaying a group of objects on the graphical user interface in a group representation, receiving a first multi-touch input in which a first number of touches associated with the group representation are moved on the graphical user interface, and in response to the first multi-touch input, changing a scale of the objects in the group representation. The method further comprises receiving a second multi-touch input in which a second number of touches associated with the group representation are moved on the graphical user interface, and in response to the second multi-touch input, changing an organization of the objects in the group representation on the graphical user interface.

13 Claims, 8 Drawing Sheets

(56) References Cited

OTHER PUBLICATIONS

IEEE 100, The Authoritative Dictionary of IEEE Standards Terms, 7th edition, copyright 2000 by The Institute of Electrical and Electronics Engineers. ISBN 0-7381-2601-2. "prompt" definition: p. 878.*

Wu; Mike, et al, "Multi-Finger and Whole Hand Gestural Interaction Techniques for Multi-User Tabletop Displays", ACM 1-58113-636-6/03/0010, Chi Letters, vol. 5, Issue 2, 2003, pp. 193-202.*

Agarawala; Anand, et al., "Keepin' It Real: Pushing the Desktop Metaphor with Physics, Piles and the Pen", ACM 1-59593-178-03/06/0004, CHI 2006, Apr. 2006, pp. 1283-1292.*

Dietz, et al., "DiamondTouch: A Multi-User Touch Technology", UIST'01, Orlando FLA, Nov. 11-14, 2001, pp. 219-226.

Chris Tengi, "The View From My Feet", Mar. 7, 2006, 6 pages, http://lookingabout.blogspot.com/2006/03/multi-touch-user-interface.html.

Josh Rubin, "Multi-touch User Interface", 2006, 2 pages. http://www.coolhunting.com/archives/2006/02/multitouch_user.php.

Tomer Moscovich, "Principles and Applications of Multi-touch Interaction", Doctoral Thesis, May 2007, 114 pages.

"Multi Touch Input Software—in Java as UI", Retrieved on Jul. 3, 2008, 3 pages. http://www.multitouchinput.com/multi-touch-multi-user-umass.shtml.

Andrew D. Wilson, "PlayAnywhere: A Compact Interactive Tabletop Projection-Vision System", Proceedings of the 18th annual ACM symposium on User interface software and technology, Seattle, WA, USA, Oct. 23-27, 2005, pp. 83-92.

* cited by examiner

MANIPULATION OF OBJECTS ON MULTI-TOUCH USER INTERFACE

BACKGROUND

Multi-touch graphical user interfaces are user interfaces for computing devices that are capable of receiving and utilizing multiple temporally overlapping touch inputs from multiple fingers, styluses, and/or other such manipulators. Such graphical user interfaces include a display system configured to display an image to a user, and a multi-touch input mechanism that is configured to detect multiple temporally overlapping touches over the display. Various types of multi-touch input mechanisms are known, including but not limited to capacitive, resistive and optical mechanisms.

The use of a multi-touch graphical user interface may enable the utilization of a broader range of touch-based inputs than a single-touch input device that cannot detect or interpret multiple temporally overlapping touches. However, current graphical user interfaces that are designed for use with a single-touch input, a single mouse input, or the like, may not be configured to utilize the capabilities offered by multi-touch input devices.

SUMMARY

Accordingly, various embodiments related to the manipulation of objects on a multi-touch graphical user interface are disclosed herein. For example, in one disclosed embodiment, a method of operating a multi-touch graphical user interface on a computing device is disclosed. The method comprises displaying a group of objects on the graphical user interface in a group representation, receiving a first multi-touch input in which a first number of touches associated with the group representation are moved on the graphical user interface, and in response to the first multi-touch input, changing a scale of the objects in the group representation. The method further comprises receiving a second multi-touch input in which a second number of touches associated with the group representation are moved on the graphical user interface, and in response to the second multi-touch input, changing an organization of the objects in the group representation on the graphical user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Various embodiments are disclosed herein that relate to the operation of a multi-touch graphical user interface. As mentioned above, many touch-sensitive graphical user interfaces for computing devices are designed for single input use scenarios, such as single touch, single cursor, single mouse, etc. While such user interfaces may provide adequate functionality for use in a multi-touch environment, single-touch user interfaces may not take advantage of the additional capabilities offered by the multi-touch use environment that may allow for a richer user experience.

Figure 1:
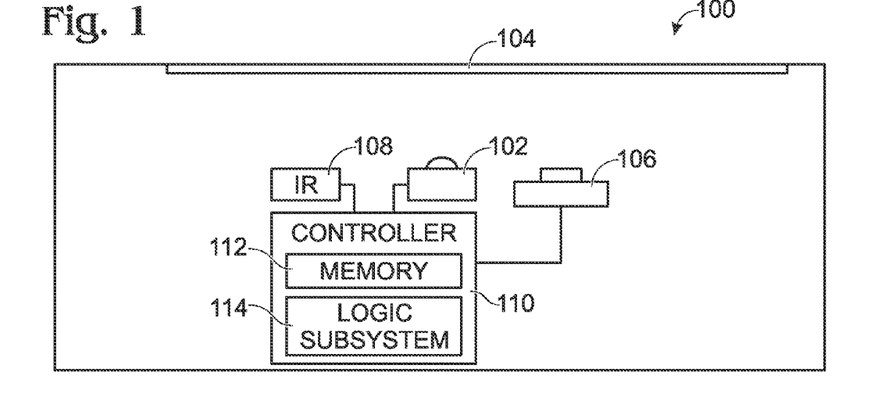
FIG. 1 shows a block diagram of an embodiment of a multi-touch computing device.

Before discussing the user interface-related embodiments disclosed herein, an example multi-touch use environment is described. FIG. 1 shows an embodiment of an example optical touch-sensitive display device 100. The optical touch-sensitive display device 100 comprises an image source 102, such as a projection device, configured to form an image on a display surface 104. The optical touch-sensitive display device 100 also comprises an image sensor 106 for acquiring an infrared image of the display surface 104 to detect objects, such as fingers, touching the display surface 104. The display surface 104 may comprise various structures such as diffuser layers, anti-glare layers, etc. not shown in detail herein. The optical touch-sensitive display device 100 further comprises an illuminant 108, depicted herein as an infrared light source, configured to illuminate a backside of the display surface 104 with infrared light. Infrared light from the illuminant 108 may be reflected by objects on the display surface 104, and then detected by image sensor 106 to allow detection of objects on the display surface 104. An optical filter (not shown) may be used to prevent unwanted wavelengths of light from reaching the image sensor 106. While the depicted embodiment comprises a single image sensor 104, it will be understood that an optical touch-sensitive display device may have any suitable number of image sensors which each may detect a portion of the display surface 104, or an entire area of the display surface 104.

The optical touch-sensitive display device 100 further comprises a controller 110 having memory 112 and a logic subsystem 114. The memory 112 may comprise instructions stored thereon that are executable by the logic subsystem 114 to control the display of images on the display surface 104, and to detect and track a plurality of objects on the display surface 104 via the image sensor 106 and illuminant 108.

The memory 112 further may comprise instructions executable by the logic subsystem 114 to present a graphical user interface that allows a user to interact with the computing device 100. The graphical user interface may be configured to allow different multiple touch inputs to trigger different functionalities related to an object or a group of objects. In some embodiments, such a user interface also may be configured to inform a user of additional multi-touch input options when a multi-touch input is detected.

Figure 2:
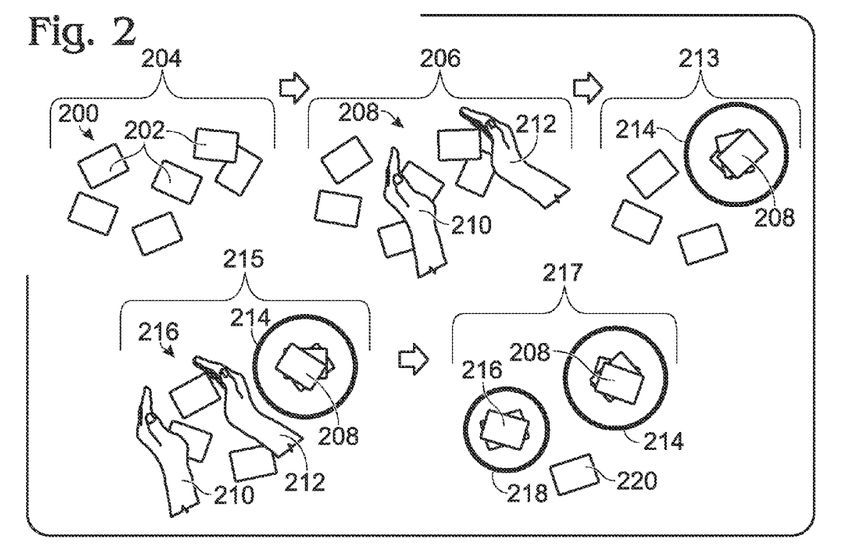
FIG. 2 shows a sequence of inputs that may be used to group objects on a graphical user interface according to an embodiment of the present disclosure.

The various multi-touch inputs described herein may be performed on individual user interface objects, or on groups of user interface objects. Additionally, a multi-touch input also may be used to define groups of objects for which additional multi-touch inputs may be made. FIG. 2 illustrates a an example of a collection 200 of objects 202 displayed on the user interface, and shows a sequence of five points in time that illustrates two multi-touch inputs used to group subsets of the user interface objects into two different groups. Each object 202 is represented as a generic rectangle on the user interface, which represents any suitable type of object that may be displayed on a user interface. Examples of such objects include, but are not limited to, icons representing files or applications, thumbnails or full-sized images that represent either still or video images, application windows, interactive objects such as touch input controls (e.g. buttons or the like) in an application window, letters/characters/symbols that may be selected for text input, or any other suitable object and/or combinations thereof.

Continuing with FIG. 2, the objects are shown at a first point in time at 204. Next, a multi-touch input is illustrated at 206 that causes a subset 208 of the set of objects 200 to be organized into a first sub-group. As depicted, the grouping multi-touch input is performed by a user placing a side of each hand 210, 212 on the graphical user interface in such a manner as to create a cupping or bracketing shape around the objects to be grouped. Upon detecting such a multi-touch input, the subset 208 of the set of objects 202 are moved on the graphical interface into a group representation, which is shown in the depicted embodiment as an overlapping or stacked configuration, as indicated at 213. Further, a border 214 may be shown around the subset 208 to further indicate that the objects within the subset 208 are segregated from other objects in the set of objects 200. After grouping the subset 208, other objects may be added to the group by dragging and dropping the objects into the group via appropriate inputs on the user interface. Further, objects may be removed from the group in a similar manner. In some embodiments, the representation of objects in the group may be changed at a user's option to facilitate such operations. The changing of group representations is described in more detail below.

Next, FIG. 2 illustrates, at 215, a formation of a grouping of a second subset 216 of objects on the user interface. As illustrated, the user cups or brackets the second subset 216 of objects using the above-described multi-touch inputs on the user interface. In response, as shown at 217, the objects in the second subset 216 are moved into a group representation, and a border 218 is illustrated on the graphical user interface around the second subset 216 of objects. It will be understood that the specific multi-touch inputs and group representations in the depicted embodiment are shown for the purpose of example, and that a user interface may be configured to accept any other suitable input to form groups of objects.

The representation of user objects in user-defined groups as shown in FIG. 2, may allow a user to manipulate the group as if the group were a single object. However, in some cases, no further inputs related to a group may be received for a period of time after initially forming the group. In some embodiments, a user interface may be configured to allow the group representation to persist indefinitely until a user selects to ungroup the objects. In other embodiments, a user interface may be configured to automatically ungroup the objects if no user input related to the group is received after a period of time. In such embodiments, the user interface may be configured to graphically represent to a user, prior to the ungrouping of a group of objects, that the objects will be ungrouped. This may prompt or invoke a user to make an input prior to the ungrouping of the objects.

Figure 3:
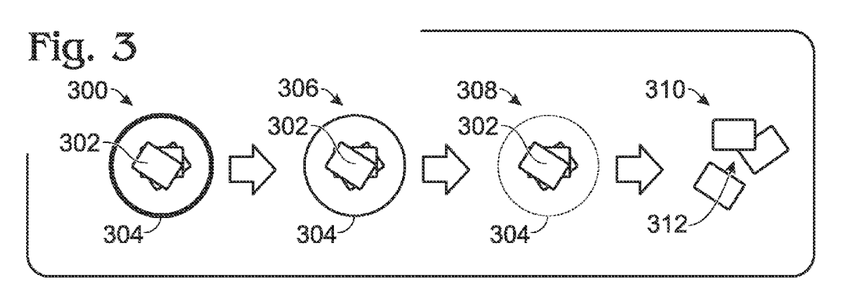
FIG. 3 illustrates an ungrouping of grouped objects over a period of time according to another embodiment of the present disclosure.

The user interface may inform a user of an upcoming ungrouping of a group representation in any suitable manner. For example, FIG. 3 depicts a group representation of a collection of user interface objects immediately after grouping at 300. The group representation comprises a graphical depiction of the objects in a stacked configuration 302, and a border around the objects 304. As shown in FIG. 3 at 306 and 308, as time passes without the receipt of a user input related to the group, the border 304 around the group progressively fades. At some later point in time, as depicted at 310, the border 304 completely disappears, and the objects move from the stacked configuration into a more random configuration 312, indicating that the objects have been ungrouped. It will be understood that the depicted embodiment illustrates one example of a method of graphically illustrating an upcoming ungrouping of objects to a user, and that any other suitable method may be used without departing from the scope of the present disclosure.

As mentioned above, the grouping of objects on a user interface allows the group of objects to be manipulated in various ways using multi-touch inputs. For some manipulations (e.g. zooming a view of the group of objects, revealing a contextual menu related to the object, etc.), the multi-touch input used to manipulate the group of objects may be used to perform the same manipulation of a single object on the user interface. For other manipulations that are not relevant to a single object (e.g. changing a group view from a first to a second group view), the multi-touch input may be configured to trigger different operations for a single object than for a group of objects. Therefore, in the discussion below, it will be understood that many of the inputs described for groups of objects also may be used for single objects in various embodiments, and that the terms "group of objects" and variants thereof represent groups of one or more objects and therefore encompass single objects.

In some embodiments, a multi-touch zoom input performed on a graphical user interface may trigger different operations on an object or group of objects depending upon how many fingers or other manipulators (e.g. styluses, etc.) are used for the input. The term "zoom input" as used herein represents a touch input associated with a group of objects in which two or more touches associated with a group of objects on a graphical user interface are moved on the graphical interface either closer together or farther apart. Where a zoom input is performed with multiple fingers on each hand, a zoom input may occur, for example, where an average location of the fingers of one hand on the graphical user interface moves farther from or closer to an average location of the fingers on another hand.

Figure 4:
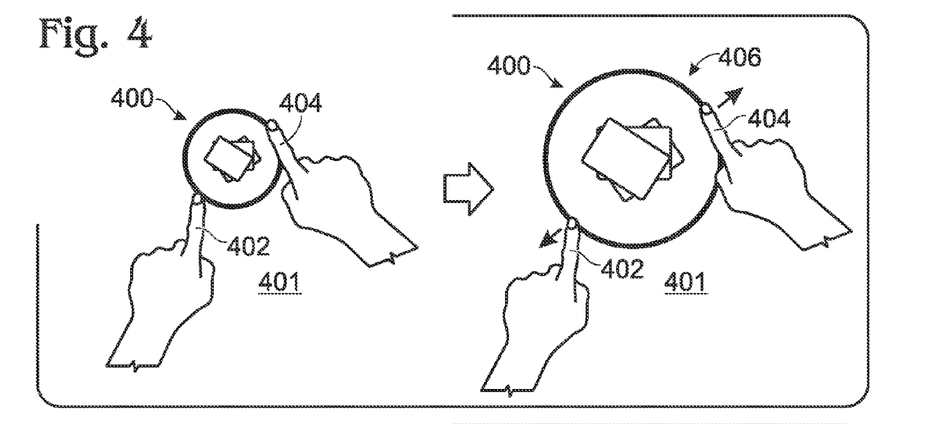
FIG. 4 shows a sequence of inputs that may be used to scale a group of objects on a graphical user interface according to an embodiment of the present disclosure.
Figure 5:
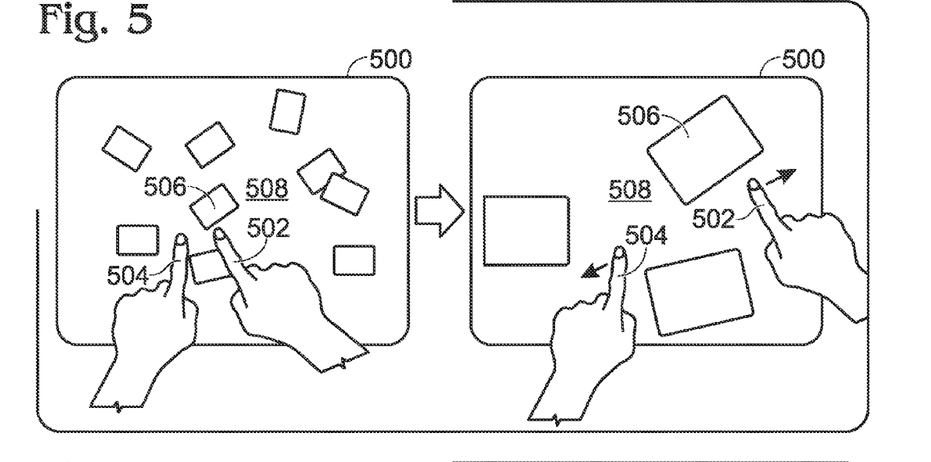
FIG. 5 shows a sequence of inputs that may be used to scale a group of objects in an application window on a graphical user interface according to an embodiment of the present disclosure.

FIGS. 4 and 5 show an embodiment of a first multi-touch zoom input in the form of a "single-finger zoom" input that may be used to manipulate a group of objects. The depicted single-finger zoom input comprises a zoom input performed with a single finger from each of a user's hand. FIG. 4 depicts such an input performed on a group of objects located on a desktop region 401 of a user interface, while FIG. 5 depicts such an input performed in an application window on a user interface. First referring to FIG. 4, the single-finger zoom input is performed by a user touching a group representation 400 at two locations over the group representation, with one finger 402, 404 at each location. As depicted, the touches are over a border of the group representation 400. However, the touches may be at any other suitable location relative to the group representation 400. Next, as depicted at 406, the touches are moved farther apart on the graphical user interface. This gesture is interpreted by the graphical user interface as a request to scale the input. As a result, the group representation 400 is enlarged on the graphical user interface an amount that corresponds to the increase in distance between the fingers on each hand. It will be understood that such an input may be used to reduce a size of the group representation 400 on the user interface by decreasing a distance between the fingers touching the user interface.

Referring next to FIG. 5, a single-finger zoom input is performed over an application window 500 by placing two fingers 502, 504 at different locations over (or otherwise associated with) the application window, and then moving the touches farther apart. As can be seen, this causes a view of objects 506 on the user interface to increase a scale of the objects shown on in the application window, with some objects being removed from a user's view. In this manner, all objects in the application window are treated as members of a group. Likewise, the view of the objects 506 in the application window may be scaled downwardly by moving two one-finger touches closer together on the user interface. It will be noted that the touches shown in FIG. 5 are located in a background region 508 of the application window, away from objects 506 in the window, which causes the entire canvas within the application window 500 to be enlarged. A user also may change a scale of a specific object in an application window by performing the disclosed multi-touch input over the object, and may group multiple objects within the application window 500 to re-scale the group, as described above for FIG. 4.

Figure 6:
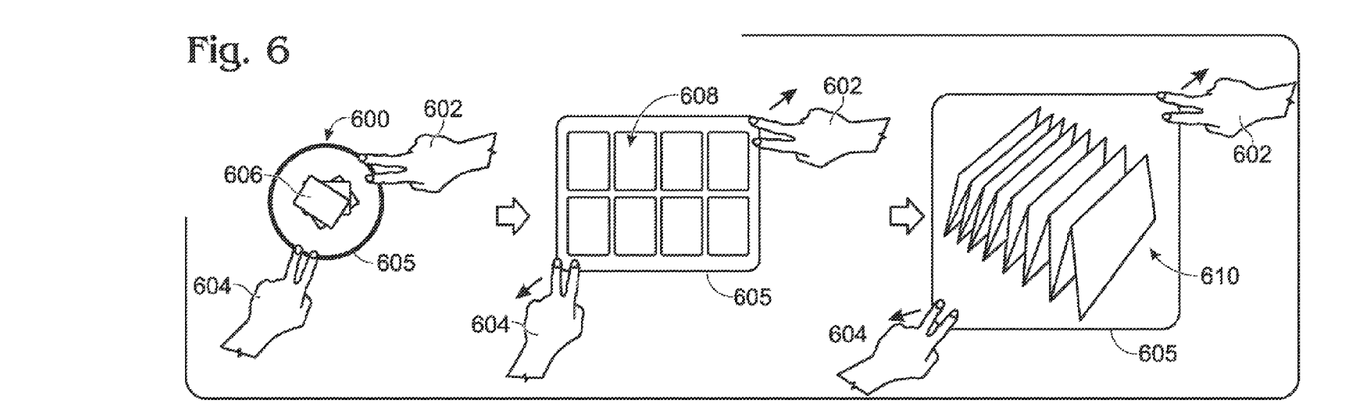
FIG. 6 shows a sequence of inputs that may be used to change an organization of a group of objects on a graphical user interface according to an embodiment of the present disclosure.
Figure 7:
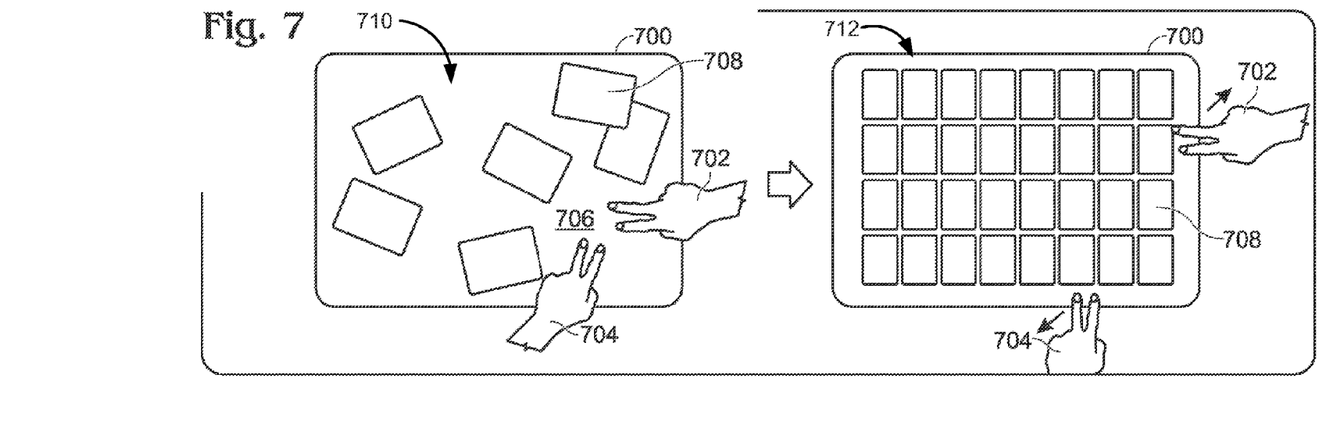
FIG. 7 shows a sequence of inputs that may be used to change an organization of a group of objects in an application window on a graphical user interface according to an embodiment of the present disclosure.

FIGS. 6 and 7 show an example of another multi-touch input that may be performed to manipulate objects or groups of objects on a user interface. FIG. 6 show an example of the input used in conjunction with a group of objects, and FIG. 7 shows an example of the input used in an application window. First referring to FIG. 6, a "two-finger zoom" input is illustrated in which two fingers from each hand 602, 604 are touched to the graphical user interface at locations associated with a group representation 600, and then a distance between the two hands is changed. As a distance between the two hands is increased, the border 605 of the group representation grows larger in circumference, and the organization of the objects in the group representation is changed from a first representation, shown as a stacked representation 606, to a second representation, shown as a tiled representation 608. In the tiled orientation, the objects in the group may be reordered, for example, by dragging and dropping an object in the group to a different location in the group. It will be understood that the tiled representation may be collapsed back into the stacked orientation by performing a two-finger zoom input in which the fingers from the user's two hands are moved closer together.

Continuing with FIG. 6, if a user continues to zoom the tiled group representation outwardly, the organization of the objects in the group representation may change to a third group representation, shown as an accordion file representation 610. In this manner, a user may change group representations without the use of a menu bar or contextual menu, as is often used with a single-touch user interface. It will be understood that the stacked, tiled, and accordion representations shown herein are examples of possible group representations, and that any other suitable group representation may be used.

FIG. 7 shows a two-finger zoom input used to change a representation of objects in an application window 700. As shown, a user may make the two-finger zoom input by touching two fingers from each hand 702, 704 in a background area 706 of the application window 700, away from objects 708 in the application window 700. Then, the user's two hands 702, 704 are moved apart, thereby changing the representation of the objects 708 in the application window from a randomly-oriented representation 710 to a tiled representation 712. It will be understood that subgroups of objects in the application window 700 may be manipulated by grouping the objects together and then manipulating the group in the manner described above. It also will be understood that the specific actions associated herein with a two-finger zoom input (i.e. change of group representation) and a single-finger zoom input (i.e. change of object scale) are disclosed for the purpose of example, and that such a touch hierarchy may be used to control any other suitable commands or operations.

Figure 8:
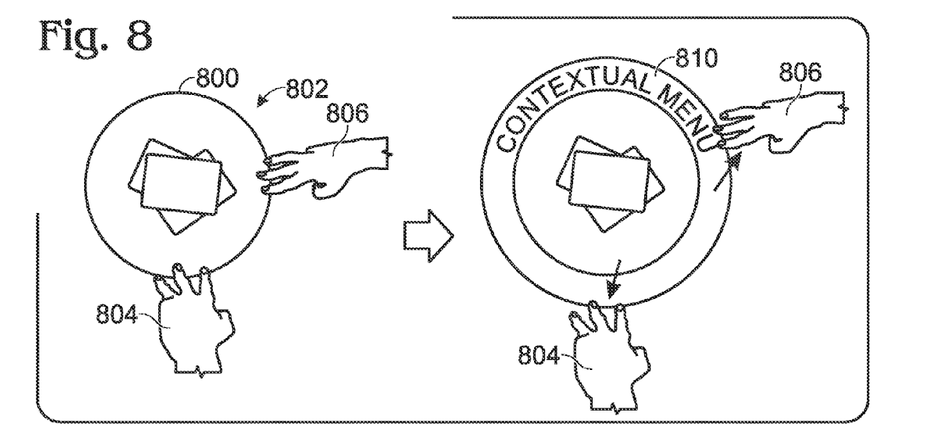
FIG. 8 shows a sequence of inputs that may be used to reveal a contextual menu for a group of objects on a graphical user interface according to an embodiment of the present disclosure.
Figure 9:
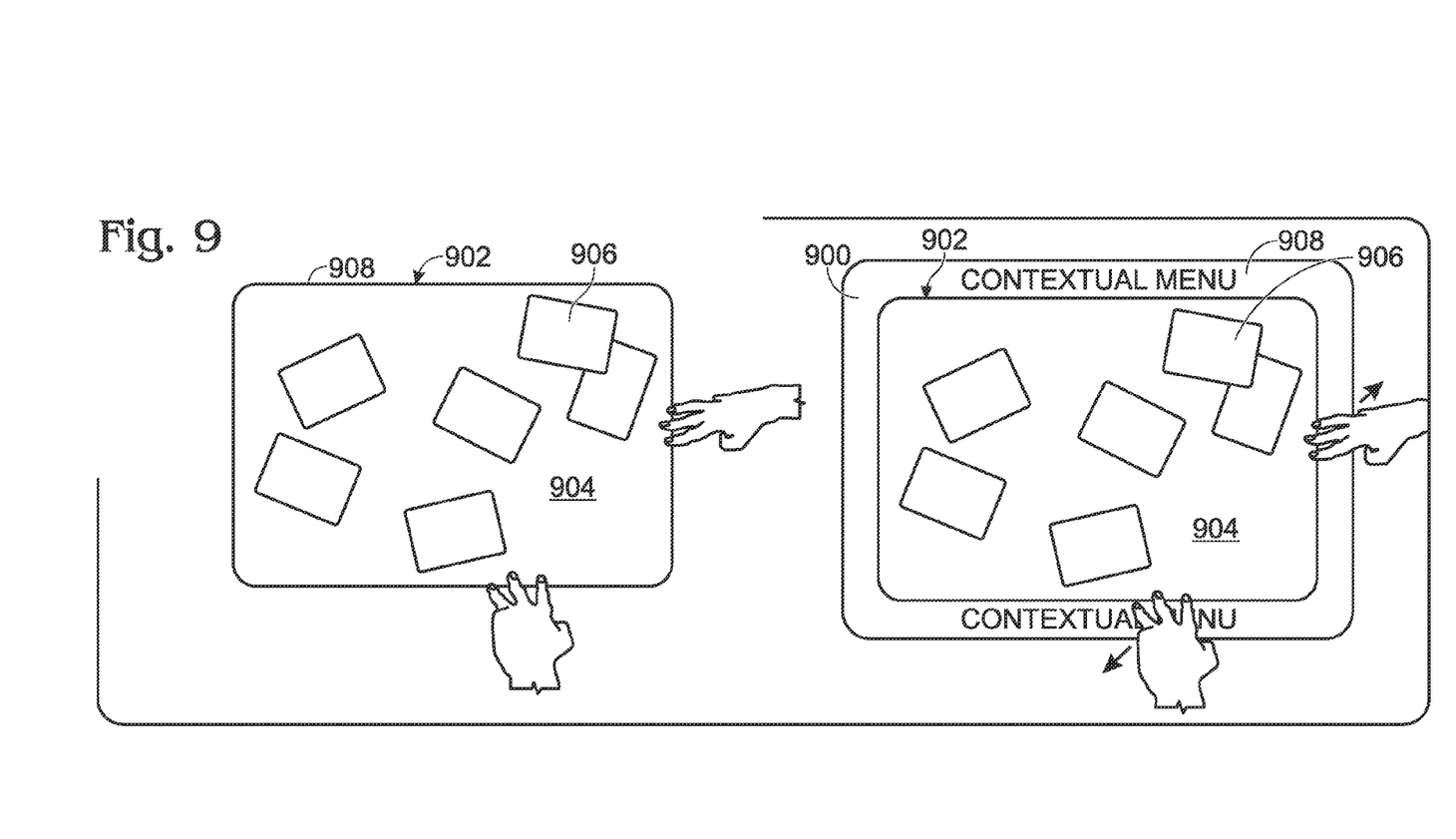
FIG. 9 shows a sequence of inputs that may be used to reveal a contextual menu for an application window on a graphical user interface according to an embodiment of the present disclosure.

FIGS. 8 and 9 show examples of another multi-touch input that may be performed to manipulate groups of objects on a user interface. Specifically, referring first to FIG. 8, these figures show a "three-finger zoom" input used to reveal a contextual menu around a border 800 of a group representation 802. The three-finger zoom input is performed by touching three fingers from each hand 804, 806 to the graphical user interface at locations associated with a group representation 800, and then increasing a distance between the two hands. As the distance between the two hands is increased, the border 800 of the group representation grows wider, revealing a contextual menu 810 between an outer diameter and an inner diameter of the border 800. Commands in the contextual menu (not shown) may then be invoked by making a touch input associated with the command, or in any other suitable manner.

Once opened, the contextual menu 810 may be closed or hidden from view in any suitable manner. For example, if a user does not select an item from the contextual menu within a predetermined period of time, the contextual menu may collapse in to the border 800 or fade away. Further, the contextual menu may disappear when a selection of an item in the contextual menu is made. Additionally, a user may collapse the contextual menu by performing a three-finger zoom input in which the user's hands are moved closer together. It will be understood that these methods of closing a contextual menu are described for the purpose of illustration, and are not intended to be limiting in any manner. It will further be appreciated that the display of a contextual menu is only an example of a function that may be invoked via a three-finger zoom input, and that any a user interface may be configured to perform any other suitable command upon receiving a three-finger zoom input.

Referring next to FIG. 9, a three-finger zoom input is shown as opening a contextual menu 900 around an application window 902. The contextual menu 900 is shown as being opened by a three-finger zoom input performed within a background region 904 of the application window away from objects 906 shown in the application window. The three-finger zoom input also may be made by touching a border 908 of the application window 902. In a similar manner, a contextual menu related to an object or a group of objects in the application window may be revealed by performing a three-finger zoom input associated with the object or group of objects of interest.

Figure 10:
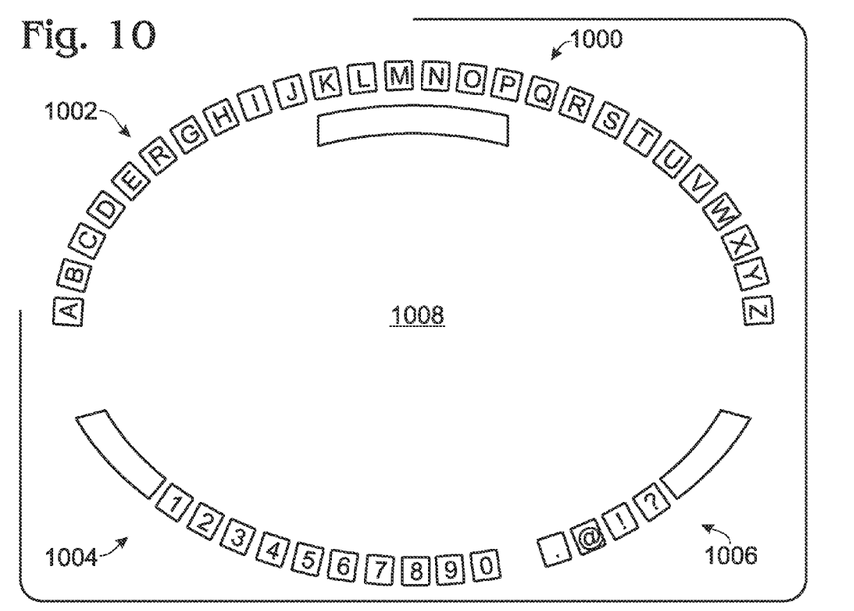
FIG. 10 shows a group of objects on a user interface in the form of a group of characters that may be used to enter text according to an embodiment of the present disclosure.
Figure 11:
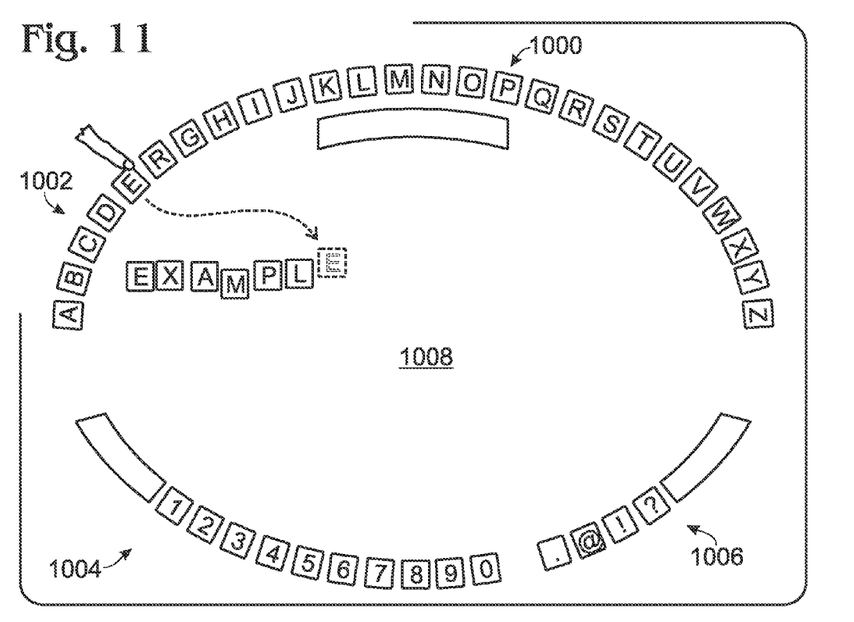
FIG. 11 shows the embodiment of FIG. 10 after a user has entered text via the group of characters.

As described above, the user interface objects shown in the above-described figures may correspond to many different types of information, including but not limited to file icons, images, videos, applications icons, application windows, etc. In some embodiments, the user interface objects may correspond to alphanumeric characters, symbols, etc. that are each displayed as separate objects. FIGS. 10 and 11 illustrate one embodiment of a user interface 1000 comprising such objects, wherein letters 1002, numbers 1004, and some commonly used characters and punctuation symbols 1006 are shown arranged in an oval pattern around a central text display field 1008. FIG. 11 illustrates one method of entering text via user interface 100. As depicted, as user may make a touch input, such as a touch, a flick, a push, etc. over a desired character. In response to the touch input, a copy of the character is moved to an appropriate destination location in the text display field 1008. A character may likewise be deleted from the text display field 1008 by making a touch input over the character in the text display field to be deleted. It will be understood that these methods of entering and deleting text via user interface 1000 are shown for the purpose of example, and are not intended to be limiting in any manner.

Continuing with FIGS. 10 and 11, each separate character shown in user interface 1000 may be a user interface object as described above. Thus, various multi-touch inputs may be used to manipulate user interface 1000. For example, a single-touch zoom input over a background region of the user interface (i.e. away from any characters) may be used to change a scale of user interface 1000 such that the entire user interface 1000 is made larger or smaller. Similarly, a single-touch zoom may be made over any one character to change a size of that character on the user interface. In some embodiments, the characters also may be moved drag-and-drop-type inputs to allow the arrangement of characters to be customized.

Further, a two-finger zoom input may be used to change a representation or organization of the characters on user interface 1000. As a specific example, the oval layout shown in FIGS. 10-11 may be reduced to a more compact QWERTY keyboard layout (or the like) by performing a two-finger zoom input to reduce the size of the representation of the characters. The layout may be further reduced to a representation of stacked letters in a similar manner. This may allow the user interface 1000 to be reduced to a small size when not in use, and then expanded for use as desired.

A three-finger zoom input may similarly be used to reveal a contextual menu for the user interface 1000, or contextual menus for any characters or groupings of characters in the user interface 1000. For example, a contextual menu for the user interface as a whole may be revealed by performing a three-finger zoom input in a background region of user interface 1000, away from characters. Likewise, a contextual menu for a character or a group of characters may be revealed by performing a three-finger zoom input associated with the characters or group of characters. It will be understood that the above-described examples of multi-touch inputs for user interface 1000 are described for the purpose of example, and are not intended to be limiting in any manner.

Figure 12:
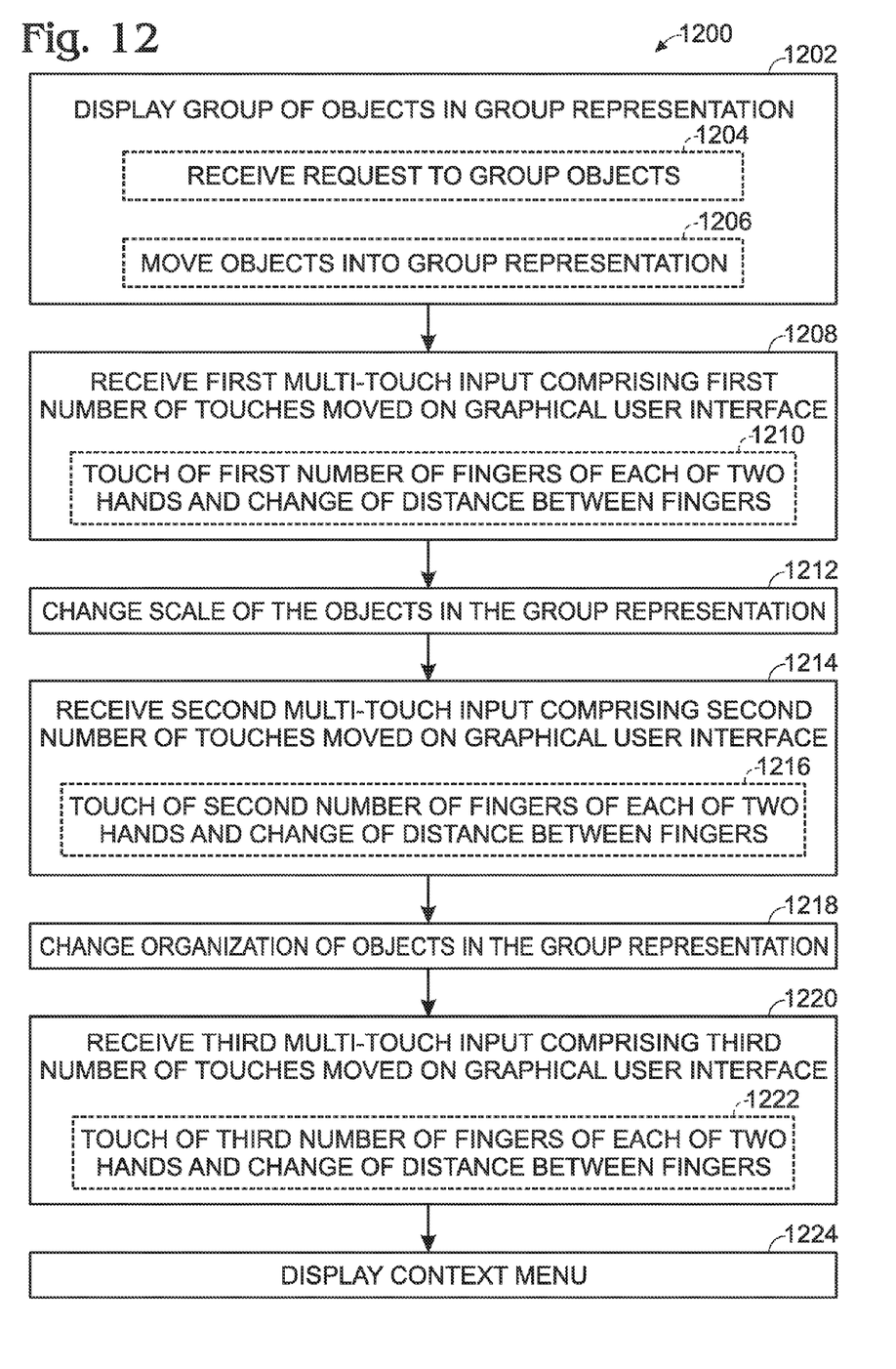
FIG. 12 shows a process flow depicting an embodiment of a method of manipulating a group of objects on a graphical user interface according to an embodiment of the present disclosure.

FIG. 12 shows an embodiment of a method 1200 of interacting with a multi-touch graphical user interface to manipulate a group of objects on the user interface. It will be understood that the term "a group of objects" may comprise one or more objects, and therefore that the methods disclosed herein also may apply to the manipulation of a single object. It will further be understood that the methods described herein may be represented by code stored in memory on a computing device, including but not limited to device 100 of FIG. 1, and executable by the computing device to perform the disclosed embodiments.

Method 1200 first comprises, at 1202, displaying a group of objects in a group representation. This may comprise, for example, displaying one or more objects in an application window or on a desktop. This also may comprise, for example, receiving at 1204, an input requesting one or more objects to be grouped, as described above for FIG. 2. This also may comprise, at 1206, moving the objects into a group representation in response to the request. The objects may be displayed in any suitable group representation. For example, the objects may be displayed in a stack, as a list, in a tiled arrangement, in an accordion-file pattern, or in any other suitable arrangement.

Next, method 1200 comprises, at 1208, receiving a first multi-touch input comprising a first number of touches moved on the graphical user interface. For example, in one embodiment, the first multi-touch input may comprise a single-finger zoom in which one finger from each of a users hands is touched to the graphical user interface, and then a distance between the user's fingers, as indicated at 1210. In other embodiments, the first multi-touch input may comprise touches by more than two total fingers. In response to the first multi-touch input, method 1200 comprises, at 1212, performing a first operation on the objects on the user interface. In the depicted embodiment, this first operation is shown as a changing the scale of the objects in the group representation in the manner described above. In other embodiments, other suitable commands other than a re-scaling operation may be performed in response to the first multi-touch input.

Method 1200 next comprises, at 1214, receiving a second multi-touch input comprising a second number of touches moved on the graphical user interface. For example, as indicated at 1216, in some embodiments, the second multi-touch input may comprise a touch of a second number of fingers of each of a user's hands, combined with a change of distance between the fingers of the two hands. In one more specific embodiment, the second multi-touch input may be a two-finger zoom input, as described above.

In response to the second multi-touch input, method 1200 comprises, at 1218, performing a second operation on the group of objects on the user interface. In the depicted embodiment, this second operation comprises changing an organization of the objects in the group representation. For example, this may comprise changing a representation of the objects between a stacked representation, a tiled representation, an accordion representation, a list representation, and/or any other suitable representation of a group of objects. It will be understood that, in other embodiments, any other suitable command than a change of a representation of a group of objects may be performed upon receiving the second multi-touch input.

Continuing with FIG. 12, method 1200 next comprises, at 1220, receiving a third multi-touch input comprising a third number of touches moved on the graphical user interface. In some embodiments, as indicated at 1222, the third multi-touch input comprises a touch of a third number of fingers on each of a user's hands, combined with a change of distance between the fingers of the two hands. In one more specific embodiment, the third multi-touch input may comprise a three-finger zoom input, as described above.

In response to receiving the third multi-touch input, method 1200 next comprises, at 1224, performing a third operation on the group of objects on the user interface. In the depicted embodiment, the third operation comprises displaying a contextual menu associated with the group of objects. It will be understood that, in other embodiments, any other suitable command or operation may be associated with the third touch input.

In some embodiments, a user interface may be configured to train new users of the user interface by informing a user of areas of potential interaction with the user interface upon detecting a touch input from a user. For example, when a user enters a single touch input on the graphical user interface, a depression, border, or other visual indicator may be displayed around or under the user's finger to alert the user that the touch is detected. Further, additional depressions or borders around other areas of touch interactivity may be displayed to inform a user where additional touch inputs may be made. In the specific case of a single-finger zoom, an area where a touch of a second finger may be made to perform a two-finger zoom may be made where a user initiates a single-finger zoom. This also may help to show a user whether a multi-touch input has been made correctly. For example, if a user touches two fingers that are spaced too closely together, the user interface may draw a single border around the two fingers. This may alert the user that the user interface has interpreted the two touches as a single touch, and therefore may allow the user to correct the input.

Figure 13:
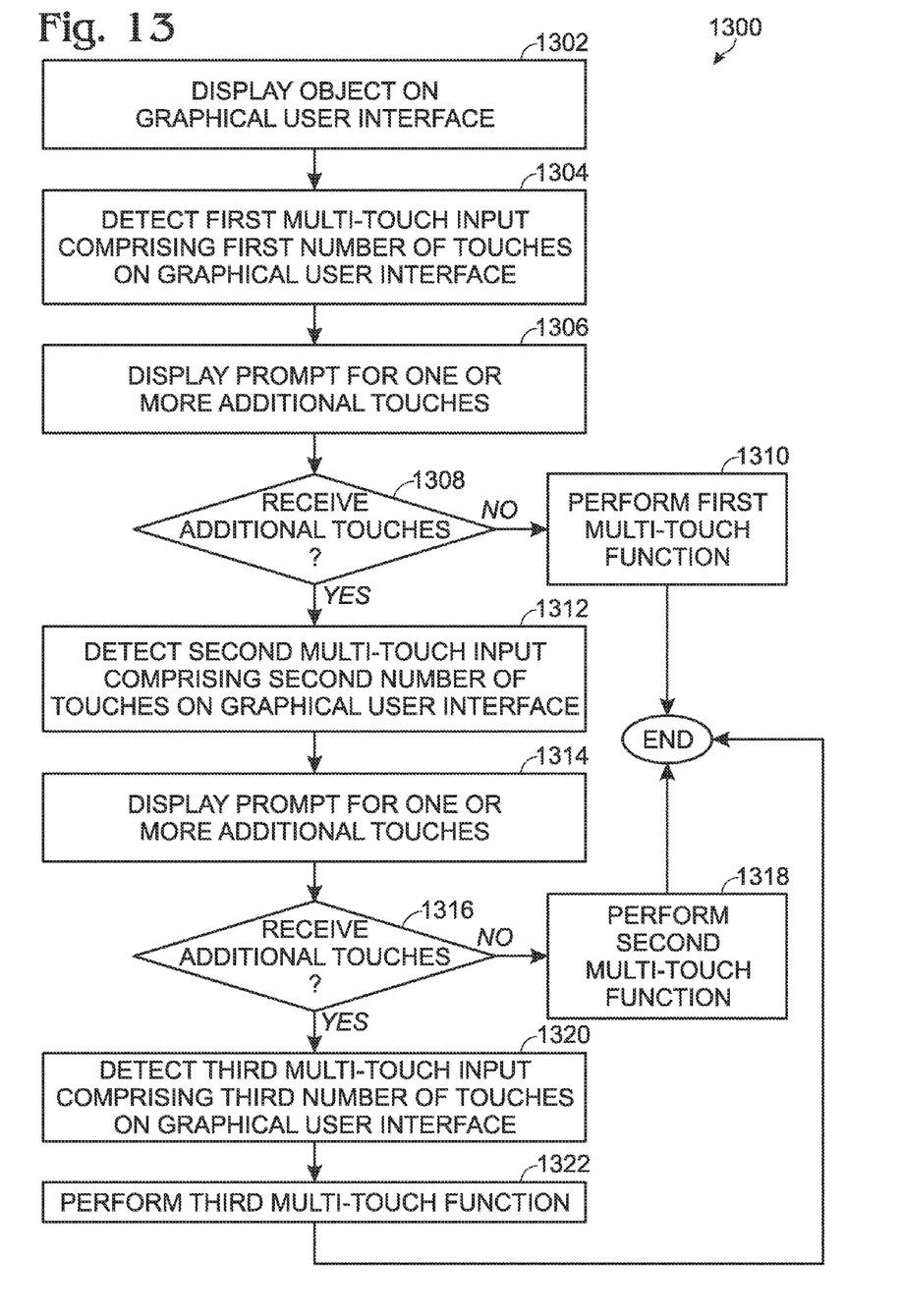
FIG. 13 shows a process flow depicting an embodiment of a method of prompting a user of a multi-touch graphical user interface to make additional touches according to an embodiment of the present disclosure.

FIG. 13 shows an embodiment of a method 1300 of a method of prompting a user of a multi-touch graphical user interface to make additional touches, thereby informing the user of availability of additional multi-touch inputs when a touch input is received. Method 1300 first comprises, at 1302, displaying an object on a graphical user interface. Next, at 1304, method 1300 comprises detecting a first multi-touch input that comprises a first number of touches on the graphical user interface. Upon detection of the first multi-touch input, method 1300 next comprises displaying a prompt for one or more additional touches. The prompt may take any suitable form. For example, an indention, border, highlighted area, aura, etc. may be displayed on the graphical user interface at the location at which the additional touches may be made.

After displaying the prompt for one or more additional touches, method 1300 next comprises, at 1308, determining whether any additional touches are received. If not, then method 1300 comprises performing a first multi-touch function that corresponds to the first multi-touch input. On the other hand, if additional touches are received, then method 1300 comprises, at 1312, detecting a second multi-touch function that comprises a second number of touches on the graphical user interface, and displaying, at 1314, a prompt for one or more additional touches.

Next, it is determined at 1316 whether any additional touches are received in response to the display of the prompt for additional touches. If not, then method 1300 comprises, at 1318, performing a second multi-touch function. On the other hand, if additional touches were received, then method 1300 comprises, at 1320 detecting a third multi-touch input that comprises a third number of touches on the graphical user interface, and then, at 1322, performing a third multi-touch function in response to the third multi-touch input. While method 1300 is shown and described in the context of first, second and third multi-touch inputs, it will be understood that the concepts may be extended to any suitable number of touches.

Figure 14:
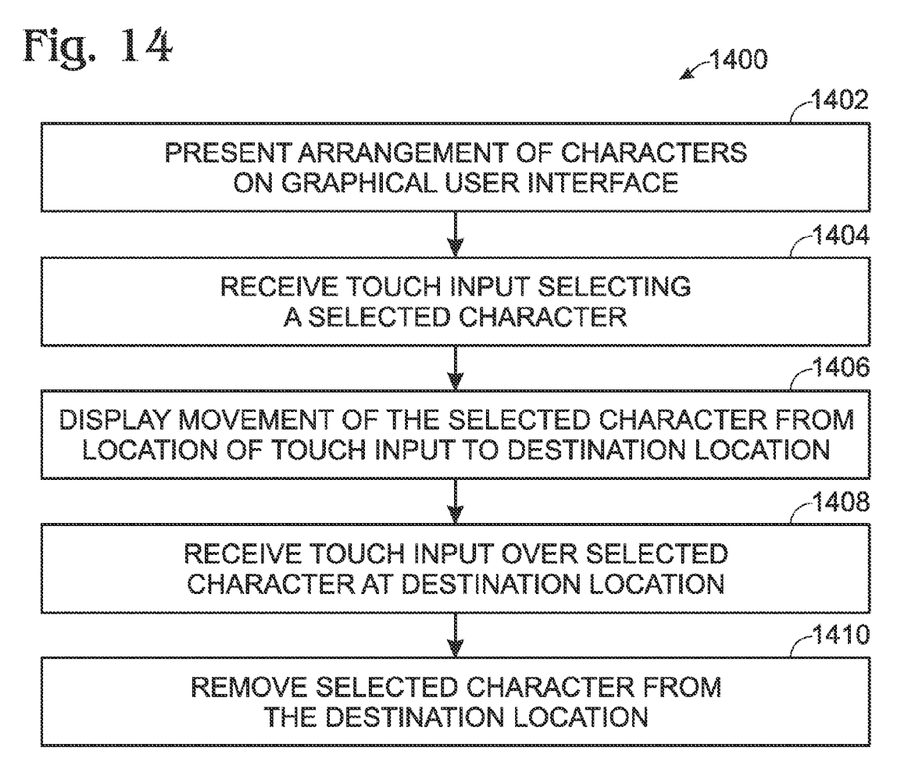
FIG. 14 shows a process flow depicting an embodiment of a method of entering text utilizing a group of objects on a graphical user interface according to an embodiment of the present disclosure.

FIG. 14 shows a method 1400 that may be used in conjunction with a graphical user interface for entering text characters, such as the graphical user interface 1000 shown in FIGS. 10 and 11. Method 1400 comprises, at 1402, presenting an arrangement of characters on a graphical user interface. The characters may include letters, numbers, symbols, and/or any other suitable character for use in text. Next, method 1400 comprises, at 1404, receiving a touch input selecting a selected letter for display in a text display field of the user interface, such as field 1008 of FIG. 10. In response to the touch input, method 1400 comprises, at 1406, displaying a movement of the selected letter from the location of the touch input to a destination location in the text display field.

Continuing with FIG. 14, method 1400 next comprises, at 1408, receiving a touch input over the selected character at the destination location in the text display field. In response, method 1400 comprises, at 1410, removing the selected character from the text display field. Processes 1408 and 1410 may occur, for example, where a user misspells a word or the like.

The various steps of method 1400 may be implemented in any suitable manner. For example, the characters may be displayed on the graphical user interface in any suitable arrangement. In some embodiments, each character may be displayed on a separate underlying object from the other characters. This is in contrast to the display of a keyboard or the like on a graphical user interface, where all characters on the keyboard are displayed as areas of a single keyboard object. The characters may be displayed on any suitable underlying object. Examples include, but are not limited to, geometric shapes such as squares, circles, rectangles, etc.; renderings of familiar objects such as blocks, balls, etc.; renderings of manipulable three-dimensional objects, or any other suitable object that may be displayed on a graphical user interface.

The display of the characters as separate objects may allow the characters to be grouped and/or manipulated as described herein. For example, a two-finger zoom input may be used to change an organization or order of the characters from the oval representation of FIG. 10 to a QWERTY or similar representation, or to expand or compress the characters between a stacked view that utilizes less space on the user interface and an expanded view that allows a user to enter text. Likewise, a three-finger zoom input may be used to reveal a contextual menu that allows, for example, a language of the user interface letters to be adjusted.

While described in the context of an optical touch sensitive device, it will be appreciated that the user interface-related embodiments disclosed herein may be used with any other suitable multi-touch device, including but not limited to capacitive and resistive devices. Further, it will be understood that the multi-touch input devices disclosed herein may be any suitable type of computing device, including but not limited to console devices, tabletop devices, desktop devices, handheld devices, etc. Such computing devices are configured to execute programs stored in non-volatile memory using portions of volatile memory and a processor and/or other logic subsystem components. As used herein, the term "program" refers to software or firmware components that may be executed by, or utilized by, an optical touch-sensitive computing device, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It will further be understood that the embodiments described herein are exemplary in nature, and that these specific embodiments or examples are not to be considered in a limiting sense, because numerous variations are contemplated. Accordingly, the present disclosure includes all novel and non-obvious combinations and sub-combinations of the various embodiments disclosed herein, as well as any and all equivalents thereof.

The invention claimed is:

1. A method of operating a multi-touch graphical user interface on a computing device, comprising:
   displaying a group of objects on the graphical user interface in a group representation, wherein the group of objects comprises three or more objects and wherein the group representation comprises a stacked organizational representation of the three or more objects that exposes a first portion of the three or more objects and occupies a first portion of a display;
   receiving a first multi-touch input in which a first number of touches associated with the group representation are moved on the graphical user interface, the first multi-touch input comprising touches of a first, equal number of fingers of each hand of a plurality of hands at a border displayed around the group representation and wherein each hand is moved a distance relative to each other hand;
   in response to the first multi-touch input, changing a scale of the objects in the group representation so as to change the portion of the display that the group representation occupies from the first portion to a second portion of the display;
   receiving a second multi-touch input in which a second number of touches associated with the group representation are moved on the graphical user interface, the second multi-touch input comprising touches of a second, equal number of fingers of each hand of the plurality of hands at the border displayed around the group representation, the second number being different than the first number and each hand being moved a distance relative to each other hand; and
   in response to the second multi-touch input, changing the group representation to a different group representation that comprises a tiled organizational representation of the three or more objects that exposes a second portion of each object of the three or more objects that is greater than the first portion of each object of the three or more objects and occupies a different, greater portion of the display than the second portion of the display.

2. The method of claim 1, wherein displaying the group of objects on the graphical user interface in the group representation comprises receiving a touch input requesting a grouping of a plurality of objects displayed on the graphical user interface, and moving the objects into the group representation on the user interface.

3. The method of claim 2, wherein moving the objects into the group representation on the user interface comprises displaying the border around the objects, reducing a brightness of the border if a user input is not received after a period of time, and releasing the objects from the group representation if no further user inputs are received during a period of time.

4. The method of claim 1, wherein displaying a group of objects on the graphical user interface in the group representation comprises displaying the group of objects in an application window.

5. The method of claim 2, wherein receiving a touch input requesting a grouping of a plurality of objects comprises detecting a bracketing of the objects by sides of hands touched to the graphical user interface.

6. The method of claim 1, wherein receiving the first multi-touch input comprises detecting a distance change between fingers of the plurality of hands resulting from relative movement between the plurality of hands, and wherein receiving the second multi-touch input comprises detecting a distance change between fingers of the hands resulting from relative movement between the plurality of hands.

7. The method of claim 6, further comprising receiving a third multi-touch input comprising a detected touch of a third number of fingers of each hand at the border displayed around the group representation and a changing of a distance between each hand, and in response, displaying a contextual menu in the border around the objects.

8. The method of claim 1, further comprising displaying a prompt for additional touches in response to receiving the first multi-touch input, wherein the prompt specifies a location at which an additional touch can be placed to accomplish the second multi-touch input.

9. The method of claim 1, wherein each object comprises a graphical representation of a letter of an alphabet on an underlying object, and wherein the method further comprises receiving an input selecting a letter, and in response, displaying on the graphical user interface a movement of the letter and the underlying object into a text display field.

10. A computing device, comprising: a display;
    a multi-touch input mechanism configured to detect multiple temporally overlapping touches on the display; a logic subsystem comprising a processor;
    and memory comprising instructions stored thereon that are executable by the logic subsystem to operate a graphical user interface via the display and the multi-touch input mechanism by:
      receiving via the multi-touch input mechanism a first multi-touch input comprising a touch of a first, equal number of fingers of each of two hands at a border displayed around a group representation occupying a first portion of the graphical user interface and a changing of a distance between the fingers of the two hands resulting from relative movement between the two hands wherein each hand is moved a distance relative to each other hand, the group representation exposing a first portion of including three or more objects displayed on the graphical user interface within the border and the group representation comprises a stacked organizational representation of the three or more objects;
      in response to the first multi-touch input, changing a scale of the three or more objects included in the group representation so as to change a portion of the graphical user interface occupied by the group representation from the first portion to a second portion of the graphical user interface;
      receiving via the multi-touch input mechanism a second multi-touch input comprising a touch of a second, equal number of fingers of each of the two hands and a changing of a distance between the fingers of the two hands resulting from relative movement between the two hands and each hand being moved a distance relative to each other hand; and in response to the second multi-touch input, changing the group representation to a different group representation that exposes a second portion of each object of the three or more objects that is greater than the first portion of each object of the three or more objects and comprises a tiled organizational representation and occupies a different, greater portion of the graphical user interface than the second portion of the graphical user interface.

11. The computing device of claim 10, wherein the instructions are further executable to, after receiving the first multi-touch input, display on the display a prompt for one or more additional touches that correspond to the second multi-touch input.

12. The computing device of claim 10, wherein receiving the first multi-touch input at the border includes receiving an input from a single finger of each of the two hands at the border, and wherein receiving the second multi-touch input at the border includes receiving an input from two fingers of each of the two hands at the border.

13. The computing device of claim 10, further comprising receiving a third multi-touch input comprising a touch of a third number of fingers of each of the two hands and a changing of a distance between the two hands, and, in response to the third multi-touch input, displaying a contextual menu on the display.

\* \* \* \* \*